United States Patent
Lee (10) Patent No.: US 10,267,524 B2
(45) Date of Patent: Apr. 23, 2019

(54) PREFILMING FUEL/AIR MIXER

(71) Applicant: Woodward, Inc., Fort Collins, CO (US)

(72) Inventor: Fei Philip Lee, Holland, MI (US)

(73) Assignee: Woodward, Inc., Fort Collins, CO (US)

( * ) Notice: Subject to any disclaimer, the term of this patent is extended or adjusted under 35 U.S.C. 154(b) by 477 days.

(21) Appl. No.: 14/856,120

(22) Filed: Sep. 16, 2015

(65) Prior Publication Data
US 2017/0074518 A1 Mar. 16, 2017

(51) Int. Cl.
F23R 3/28 (2006.01)
F23R 3/14 (2006.01)
F23R 3/34 (2006.01)

(52) U.S. Cl.
CPC ............. *F23R 3/286* (2013.01); *F23R 3/14* (2013.01); *F23R 3/346* (2013.01); *F23D 2900/11101* (2013.01); *Y02T 50/675* (2013.01)

(58) Field of Classification Search
CPC .. F23R 3/286; F23R 3/14; F23R 3/283; F23R 3/343; F23C 7/004; F23D 14/64
USPC .................................................. 60/747, 748
See application file for complete search history.

(56) References Cited

U.S. PATENT DOCUMENTS

| 4,735,044 | A | | 4/1988 | Richey et al. | |
|---|---|---|---|---|---|
| 5,165,241 | A | * | 11/1992 | Joshi | F23R 3/14 60/737 |
| 5,269,468 | A | | 12/1993 | Adiutori | |
| 5,351,477 | A | * | 10/1994 | Joshi | F23C 7/004 239/400 |
| 5,361,578 | A | | 11/1994 | Donlan | |
| 5,423,178 | A | | 6/1995 | Mains | |
| 5,680,766 | A | * | 10/1997 | Joshi | F23C 7/004 239/405 |

(Continued)

FOREIGN PATENT DOCUMENTS

| DE | 4127455 | 2/1993 |
|---|---|---|
| EP | 1793169 | 6/2007 |

(Continued)

OTHER PUBLICATIONS

International Search Report and Written Opinion of the International Searching Authority issued in International Application No. PCT/US2016/051749 dated Nov. 28, 2016; 11 pages.

(Continued)

*Primary Examiner* — Todd E Manahan
*Assistant Examiner* — Rene D Ford
(74) *Attorney, Agent, or Firm* — Fish & Richardson P.C.

(57) ABSTRACT

A turbine combustor assembly includes a fuel/air mixer assembly having a plurality of fuel/air mixer elements and a fuel injector coupled to the fuel/air mixer assembly. Each of the fuel/air mixer elements includes: a fuel/air mixer body having an internal cavity extending axially between an air inlet and an air outlet; and a prefilmer residing within an interior cavity of the fuel/air mixer body, the prefilmer including an axial inner air flow passage extending coaxially with an axial centerline of the internal cavity of the fuel/air mixer body and a radial fuel injection port into the air flow passage. The fuel injector is arranged to direct fuel into a plurality of the fuel/air mixer elements via the fuel injection port of the prefilmer of each fuel/air mixer element.

19 Claims, 12 Drawing Sheets

(56) References Cited

U.S. PATENT DOCUMENTS

| | | | |
|---|---|---|---|
| 5,930,999 A * | 8/1999 | Howell | F23D 11/107 |
| | | | 239/402 |
| 6,076,356 A | 6/2000 | Pelletier | |
| 6,357,222 B1 | 3/2002 | Schilling et al. | |
| 6,415,594 B1 * | 7/2002 | Durbin | F23R 3/286 |
| | | | 60/748 |
| 6,915,638 B2 | 7/2005 | Runkle et al. | |
| 8,935,911 B2 * | 1/2015 | Nonaka | F23D 11/386 |
| | | | 60/39.094 |
| 2004/0050058 A1 * | 3/2004 | Ohri | F23R 3/14 |
| | | | 60/748 |
| 2007/0251503 A1 | 11/2007 | Buehner | |
| 2009/0113893 A1 * | 5/2009 | Li | F23R 3/14 |
| | | | 60/737 |
| 2010/0293955 A1 * | 11/2010 | Berry | F23R 3/10 |
| | | | 60/742 |
| 2010/0308135 A1 | 12/2010 | Yamamoto et al. | |
| 2011/0067404 A1 * | 3/2011 | Johnson | F02C 7/222 |
| | | | 60/747 |
| 2014/0150434 A1 * | 6/2014 | Belsom | F23R 3/286 |
| | | | 60/739 |
| 2015/0128607 A1 | 5/2015 | Lee | |

FOREIGN PATENT DOCUMENTS

| | | |
|---|---|---|
| JP | H0849513 | 2/1996 |
| JP | 2006138566 | 6/2006 |
| WO | WO 2014/204449 A1 | 12/2014 |

OTHER PUBLICATIONS

Ajmani et al., "Parametric Design of Injectors for LDI-3 Combustors", Propulsion and Energy Forum, Jul. 27-29, 2015, 14 pages.

PCT International Preliminary Report on Patentability, PCT/US2016/051749, dated Mar. 29, 2018, 8 pages.

* cited by examiner

PREFILMING FUEL/AIR MIXER

BACKGROUND

The gas turbine engine is the preferred class of internal combustion engine for many high power applications. Fundamentally, the gas turbine engine features an upstream rotating compressor coupled to a downstream turbine, and a combustion chamber in-between. The combustion chamber can include multiple mixers to mix fuel and air prior to combustion. Typically, each mixer requires an individual fuel injector tip to spray the fuel into the mixer's airflow.

SUMMARY

In one aspect of the present disclosure, a turbine combustor assembly includes a fuel/air mixer assembly including a plurality of fuel/air mixer elements, and a fuel injector coupled to the fuel/air mixer assembly. Each of the fuel/air mixer elements includes: a fuel/air mixer body having an internal cavity extending axially between an air inlet and an air outlet; and a prefilmer residing within an interior cavity of the fuel/air mixer body, the prefilmer including an axial inner air flow passage extending coaxially with an axial centerline of the internal cavity of the fuel/air mixer body and a radial fuel injection port into the air flow passage. The fuel injector is arranged to direct fuel into a plurality of the fuel/air mixer elements via the fuel injection port of the prefilmer of each fuel/air mixer element.

In some examples, the fuel injector includes a tip portion including a central fuel outlet and a plurality of peripheral fuel outlets, each of the peripheral fuel outlets being fluidically coupled to a respective fuel injection port. In some examples, at least one of the peripheral fuel outlets includes a non-atomizing fuel injection orifice. In some examples, the central fuel outlet includes at least one of an air-blast injector tip and a pressure atomizing injector tip.

In some examples, the fuel injection port of the prefilmer of at least one fuel/air mixer element is biased in an offset direction relative to an axial centerline of the prefilmer. In some examples, the offset direction is in accord with a curved inner wall of the prefilmer, such that fuel entering the prefilmer through the fuel injection port forms a substantially continuous film along the inner wall. In some examples, the prefilmer of the at least one fuel/air mixer element includes an air swirler residing within the axial inner air flow passage at location upstream of the fuel injection port.

In some examples, the prefilmer of at least one fuel/air mixture element includes an air swirling vane residing on an outer surface of the prefilmer. In some examples, a trailing edge of the air swirling vane is arranged to at least partially shield fuel directed through the fuel injection port from cross flowing air traversing the inner cavity of the fuel/air mixer body.

In some examples, the inner air flow passage of the prefilmer of at least one fuel/air mixer element includes a converging nozzle outlet. In some examples, the fuel/air mixer body of the at least one fuel/air mixer element includes a Venturi structure defining an annular pinch gap adjacent the nozzle outlet of the prefilmer and a throat mixing region at a point downstream from the pinch gap.

In some examples, the prefilmer includes a plurality of radial fuel injection ports and a plurality of concentric inner air flow passages, each of the fuel injection ports being arranged to direct a separate fuel stream into a respective inner air flow passage.

Another aspect of the present disclosure includes a method for providing a fuel/air mixture in a turbine combustor assembly. The method includes: receiving fuel at a fuel injector coupled to a fuel/air mixture assembly, the fuel/air mixture assembly including a plurality of fuel/air mixer elements, each of the fuel/air mixer elements including at least one prefilmer located within an interior cavity of the respective fuel/air mixer element; radially directing fuel from the fuel injector into an axial inner air flow passage of the respective prefilmer of each fuel/air mixture element, such that the fuel forms a substantially continuous film along an inner wall of the prefilmer; and axially directing air through the inner air flow passage of each respective prefilmer to convey the fuel film towards an outlet of the prefilmer.

In some examples, receiving fuel at the fuel injector includes receiving the fuel at a tip portion of the fuel injector, the tip portion including a central fuel outlet and a plurality of peripheral fuel outlets, each of the peripheral fuel outlets being fluidically coupled to a respective fuel injection port of each prefilmer. In some examples, at least one of the peripheral fuel outlets includes a non-atomizing fuel injection orifice producing a plain jet of liquid fuel, and the central fuel outlet includes at least one of an air-blast injector tip and a pressure atomizing injector tip producing an atomized spray of fuel.

In some examples, radially directing fuel into the axial inner air flow passage of the respective prefilmer includes directing the fuel through a fuel injector port of the prefilmer, the fuel injection port being biased in an offset direction relative to an axial centerline of the prefilmer. In some examples, the offset direction is in accord with a curved inner wall of the prefilmer, such that fuel entering the prefilmer through the fuel injection port forms a substantially continuous film along the inner wall. In some examples, the prefilmer includes an air swirler residing within the axial inner air flow passage at location upstream of the fuel injection port, such that axially directed air traversing the inner air flow passage is forced into a swirling motion along the inner wall to carry the fuel film.

In some examples, the method further includes: axially directing air through the interior cavity of each respective fuel/air mixer element, and shielding the radially directed fuel from the axially directed air traversing the interior cavities. In some examples, shielding the radially directed fuel includes providing an at least partially cupped channel leading from the fuel injector to a fuel injector port of each prefilmer. In some examples, the partially cupped channel is integrated with a trailing surface of a swirling vane residing on an outer surface of each prefilmer.

In some examples, the at least one prefilmer includes a plurality of radial fuel injection ports and a plurality of concentric inner air flow passages, each of the fuel injection ports being arranged to direct a separate fuel stream into a respective inner air flow passage.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings may indicate like elements.

DETAILED DESCRIPTION

Figure 1:
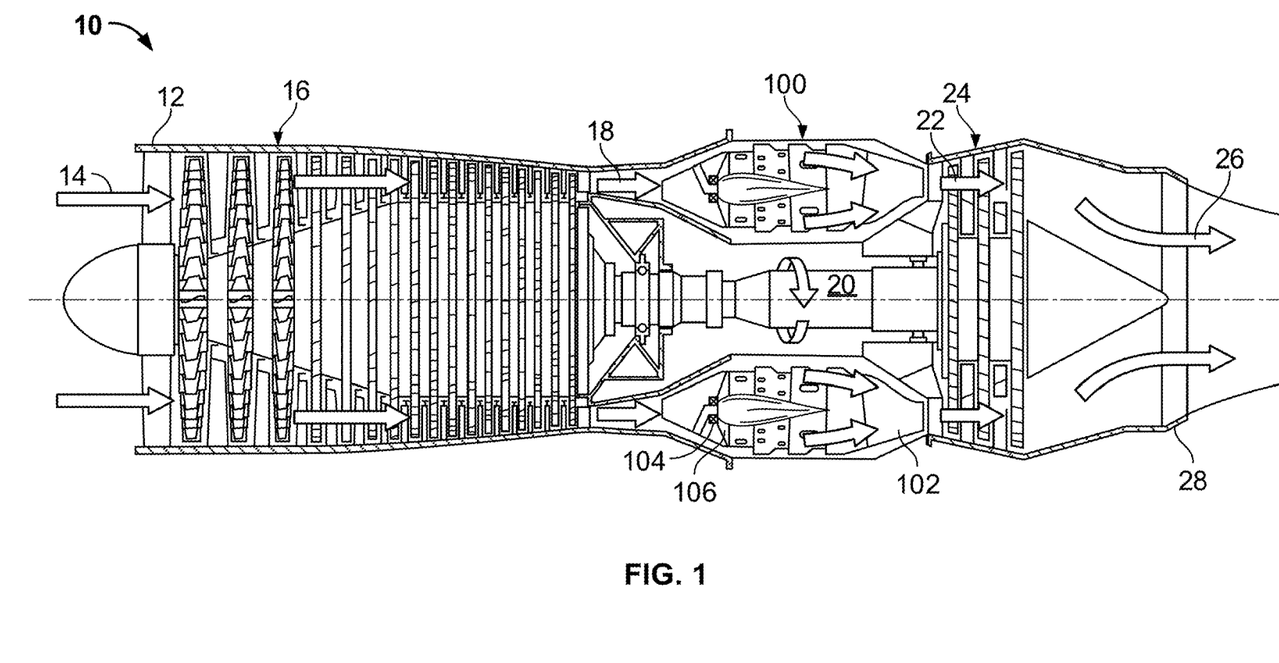
FIG. 1 is a half, side cross-sectional view of an example gas turbine engine.

FIG. 1 is a half, side cross-sectional view of an example gas turbine engine 10. The gas turbine engine 10 is turbojet-type gas turbine that could be used, for example, to power jet aircraft. However, the concepts described in the present disclosure are not so limited, and can be incorporated in the design of various other types of gas turbine engines (e.g., turbofan, turboprop, turboshaft, industrial/marine engines or others).

As shown, the gas turbine engine 10 generally facilitates a continuous axial flow of gas. That is, gas generally flows through the engine 10 in the axially downstream direction indicated by the arrows in FIG. 1. The gas turbine engine 10 includes an intake 12 that receives ambient air 14 and directs the ambient air to a compressor 16. The ambient air 14 is drawn through multiple stages of the compressor 16. High-pressure air 18 exiting the compressor 16 is introduced to a combustor 100. In certain instances the combustor 100 is an annular combustor circumscribing the engine's main shaft 20 or a can-type combustor positioned radially outward of the shaft.

The combustor 100 includes a combustion shield 102, multiple fuel injectors 104, and a combustor dome 106. At the combustor 100, the high-pressure air 18 is mixed with liquid hydrocarbon fuel (not shown) and ignited to produce heated combustion products 22. The combustion products 22 are passed through multiple stages of a turbine 24. The turbine 24 extracts energy from the high-pressure, high-temperature combustion products 22. Energy extracted from the combustion products 22 by the turbine 24 drives the compressor 16, which is coupled to the turbine by the main shaft 20. Exhaust gas 26 leaving the turbine 24 is accelerated into the atmosphere through an exhaust nozzle 28 to provide thrust or propulsion power.

Figure 2A:
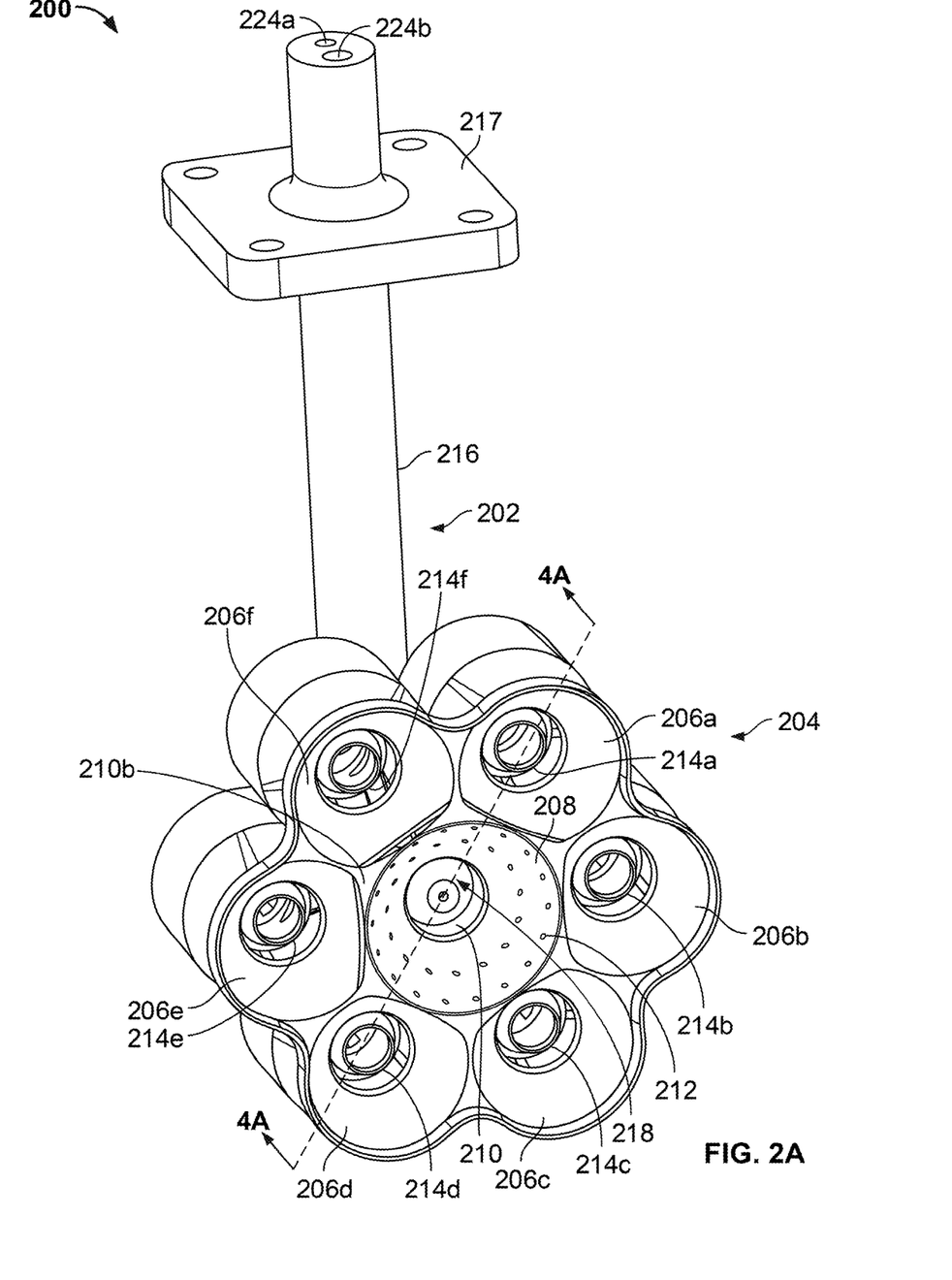
FIG. 2A is a front perspective view of an example gas turbine combustor sub-assembly, including a fuel/air mixer assembly and fuel injector assembly.
Figure 2B:
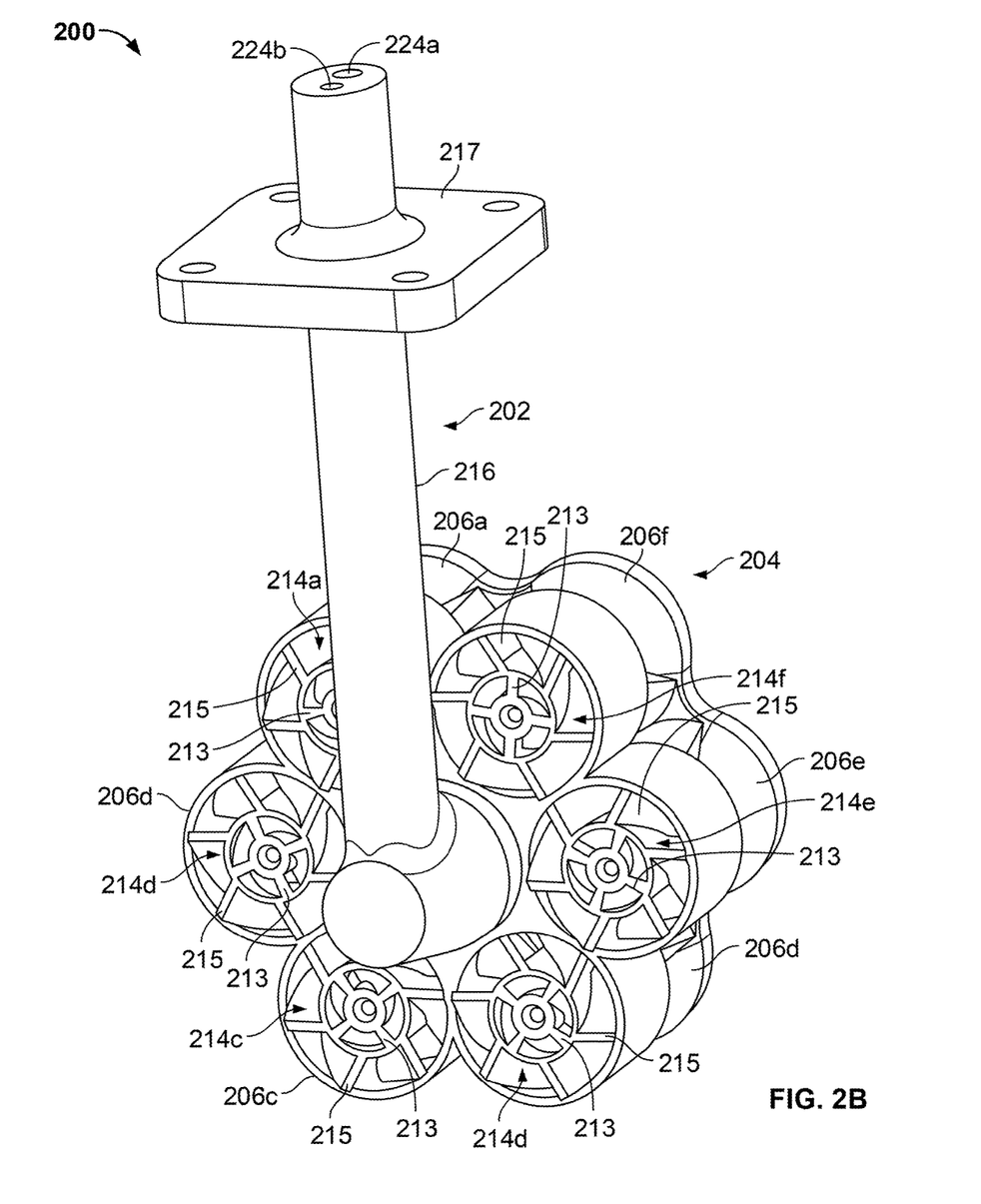
FIG. 2B is a rear perspective view of the example gas turbine combustor sub-assembly of FIG. 2A.

FIGS. 2A and 2B are front and rear perspective views of an example gas turbine combustor sub-assembly 200. The example turbine combustor sub-assembly 200 mixes air and fuel (e.g., liquid or gaseous fuel) and enables combustion of the air/fuel mixture within a combustor (e.g., the combustor 100). In some implementations, multiple of the sub-assemblies 200 may be arranged together to form a combustor assembly. The turbine combustor sub-assembly 200 can be implemented in a suitable gas turbine engine, such as gas turbine engine 10 shown in FIG. 1. The example gas turbine combustor sub-assembly 200 includes an example fuel injector assembly 202 and an example fuel/air mixer assembly 204. The mixer assembly 204 includes a plurality of mixer elements 206a, 206b, 206c, 206d, 206e, 206f and a center element 208. As shown, the mixer elements 206a, 206b, 206c, 206d, 206e, 206f are affixed to each other as well as to the center element 208 to form a unitary structure, with the mixer elements residing in a symmetrical arrangement around the center element 208, equidistant from a center location. In other implementations, the mixer elements 206a-f can be arranged in other suitable configurations (e.g. asymmetrically). Further, in other implementations, the mixer assembly 204 can include more or fewer mixer elements and/or mixer elements of different shapes and sizes. The mixer assembly 204 can be coupled to the fuel injector (e.g. fuel injector 104) to be carried with the fuel injector or it can be coupled to a combustor dome (e.g. dome 106) and the injector subsequently coupled to the mixer assembly 204. In some cases, the mixer elements 206a-f are coupled to a dome plate (not shown) of the combustor dome.

Each of the example mixer elements 206a-f includes a fuel/air mixer body 207 (see FIG. 4A), which defines an internal cavity that facilitates the mixing of air and fuel for combustion. In this example, the mixer body 207 includes a conical-cylindrical-conical, converging-diverging venturi structure (also referred to as a simply a "venturi" herein). In other implementations, the mixer body 207 of one or more mixer elements 206a-f can include a venturi having a different shape, size or proportions. Furthermore, in other implementations, the mixer body 207 of one or more mixer elements 206a-f may include a non-venturi structure having a significantly different configuration suitable for promoting the mixing of air and fuel for combustion. In the example fuel/air mixer assembly 204, each of the example mixer elements 206a-f includes a respective prefilmer 214a-f. The prefilmers 214a-f are located within the internal cavities of the mixer bodies 207 and are designed to impart a swirling motion on the incoming air that facilitates the mixing of air and fuel. Each of the prefilmers 214a-f can include at least one axial fan (also referred to as an "air swirler") to induce the swirling motion, though other configurations or types of prefilmers may be used in different implementations. The air swirlers may include a circumferential array of angled air swirler vanes distributed at regular (or irregular) intervals about a central axis. The axial and tangential components of the vane angle affects the degree of swirl imparted on the incoming air. The particular number of vanes and/or the dimensions and orientations of the vanes may vary between different implementations without departing from the scope of the present disclosure. In this example, the prefilmers 214a-f include two air swirlers—an inner air swirler 213 and an outer air swirler 215 (see FIG. 2B). As discussed in detail below, one or more of the prefilmers 214a-f may include an outer air swirler 215 having an air swirler vane featuring a trailing edge that at least partially shields a radially directed stream of fuel from cross-flowing air directed axially through the mixer body 207.

The center element 208 defines a central mixer passage 210 having a venturi that enables mixing of airflow and fuel.

Fuel is fed from the fuel injector assembly 202 into the central mixer passage 210 where it meets with a radial-axial flow of air fed through holes 210a, and the fuel/air mixture from the central mixer passage 210 is combusted. In some implementations, the flat surface 210b (FIG. 2A)-around the center element 208 defines a bluff-body flame holder which provides a standing flame to ignite the fuel/air mixture output from the mixer elements 206a-f. The center element 208 further includes a plurality of cooling air passages 212. Airflow through the cooling passages helps maintain the center element 208 within acceptable temperatures for the materials of the element. Furthermore, the airflow from the cooling air passages mixes with the fuel output from the central mixer passage 210.

Figure 3:
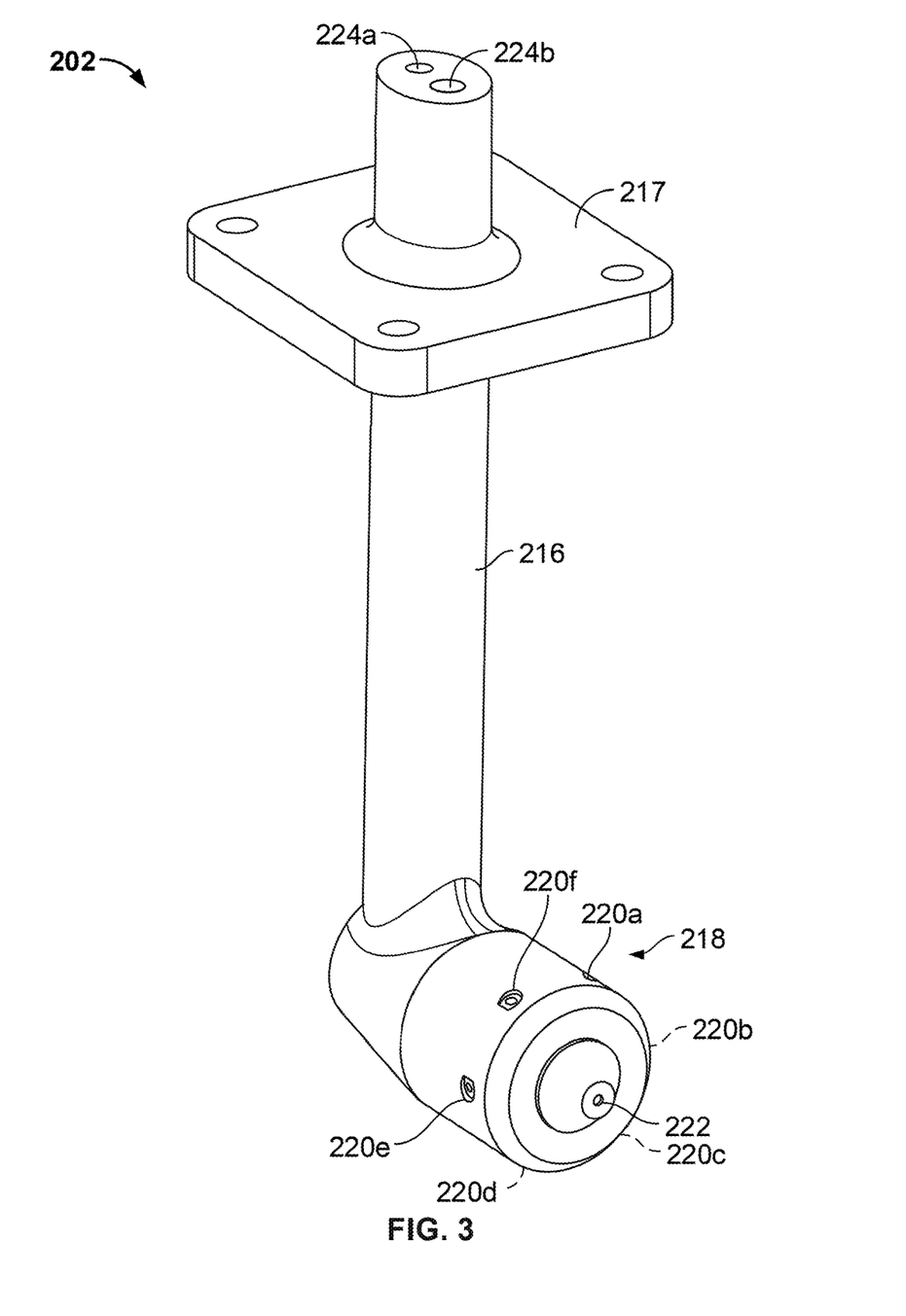
FIG. 3 is a front perspective view of an example fuel injector assembly.

FIG. 3 shows a front perspective view of the example fuel injector assembly 202 of FIG. 2A and FIG. 2B. The fuel injector assembly 202 includes a stem 216 with a securing flange 217 and an example tip portion 218. The tip portion 218 includes the extreme tip of the fuel injector. The tip portion 218 includes multiple peripheral fuel orifices 220a-f and a central orifice 222. The tip portion 218 can be a single tube having a cylindrical shape or some other shape. The tip portion 218 includes one or more internal passages that feed fuel to the orifices 220a-f, 222. The peripheral orifices 220a-f and central orifice 222 "spray" or inject liquid or gaseous fuel, and/or other fluids such as water or steam into the airflow of mixer assembly 204. In some examples, the orifices 220a-f and 222 can be designed to produce a specified spray pattern of fuel, for example to produce a jet, a hollow or solid cone, or another specific shape (e.g., fan or other shape). Furthermore, the orifices 220a-f and 222 may include fuel injector tips designed to produce sprays of liquid fuel having varying degrees of atomization. In this example, the central orifice includes a pressure atomizing type fuel injector tip, and the peripheral orifices 220a-f include fuel injector tips designed to produce a continuous jet stream of unatomized liquid fuel (hereinafter termed an "non-atomizing fuel injector orifice" producing "a plain jet of fuel"). Of course, various other types of fuel injection tips (e.g., an air-blast type fuel injector tip) and different configurations of fuel injector tips may be employed without departing from the scope of the present disclosure. The peripheral orifices 220a-f are located circumfentially around the tip portion 218, and oriented radially outward, such that each peripheral orifice 220a-f is in alignment with a corresponding mixer element 206a-f. Thus, the peripheral orifices 220a-f are configured to spray fuel into the internal cavity of the mixer body 207 of the associated mixer elements 206a-f, respectively. The central orifice 222 sprays fuel into the central mixer passage 210 of the center element 208. The plurality of orifices 220a-f and 222 enable the fuel injector assembly 202 to supply fuel to multiple mixer elements using only a single tip or tip portion. The orifices 220a-f and 222 can be orifice devices that thread or are otherwise installed into the tip portion 218, or the orifices can be integral in the sidewall of the tip portion 218 (e.g., machined, laser cut, etc.).

The example fuel injector assembly 202 includes fuel feeds 224a, 224b that are internal passages or tubes within the stem 216 and the tip portion 218. The fuel feeds 224a, 224b are fluidly connected to the peripheral orifices 220a-f and the central orifice 222. The fuel feeds 224a, 224b supply fuel to the orifices 220a-f and 222. In some implementations, the fuel feeds 224a-c can include annular passages within the tip portion 218. The fuel feeds 224a, 224b and the orifices 220a-f and 222 can be connected such that one fuel feed (e.g. 224a) supplies fuel to a subset or group of the orifices (e.g. 220a, 220c, 220e). Likewise, a separate fuel feed (e.g. 224b) can supply fuel to another subset or group of the orifices (e.g. 220b, 220d, 220f). The central orifice 222 can be connected to either or both of the fuel feeds 224a, 224b and/or have a separate fuel feed (not shown). The fuel feeds and orifices can be connected in this configuration or another configuration, and more or fewer fuel feeds or orifices can be used. In this manner, the example fuel injector assembly can selectively supply or not supply fuel to a first group of orifices (and thus a first group of mixer elements) and to a second group of orifices (and thus a second group of mixer elements) independently, thus enabling staging the mixer elements to produce different combustion conditions. The fuel injector assembly can be designed to separately control any number of groups of orifices. The fuel injector assembly can thus be a staged system designed to supply fuel independently to different groups of orifices and mixer elements.

Figure 4A:
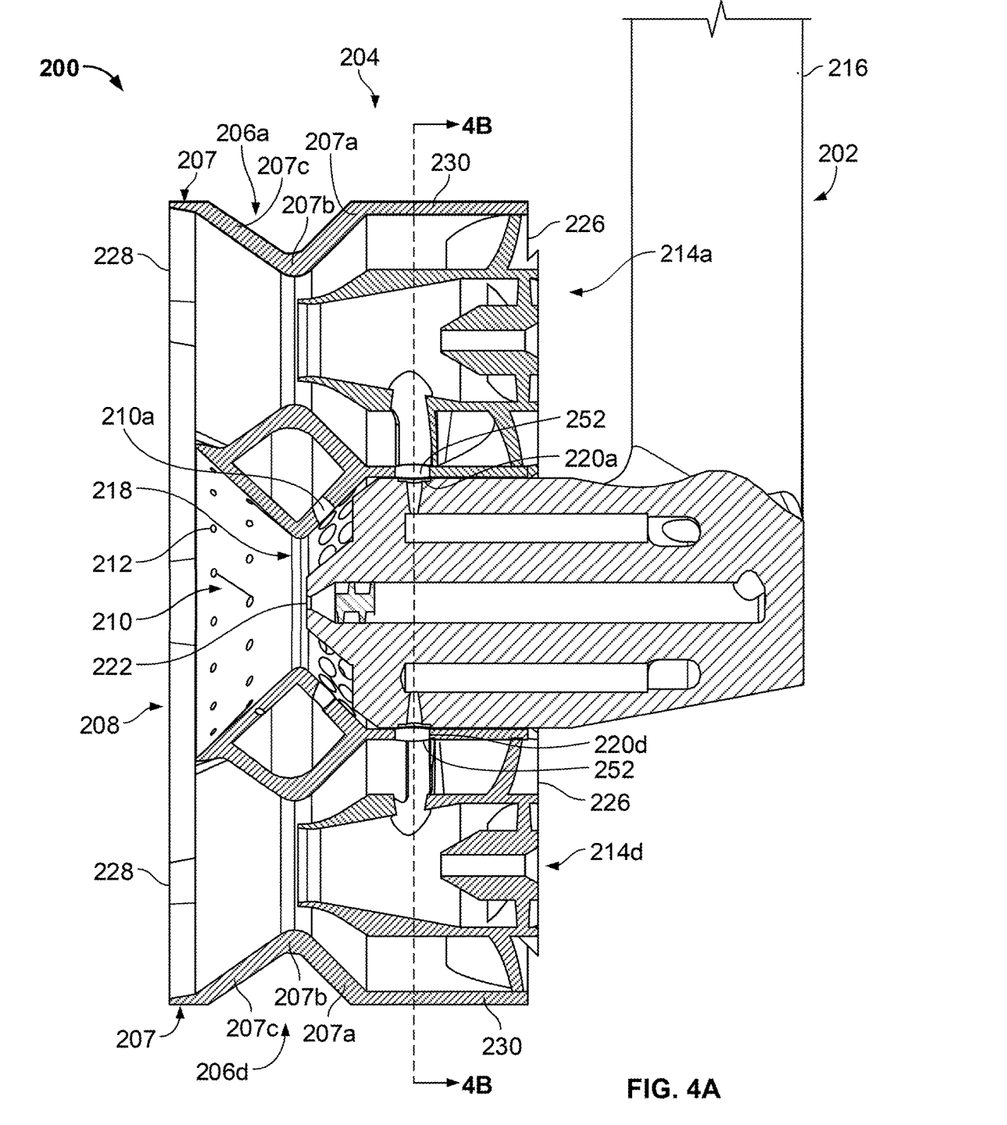
FIG. 4A is a partial, side cross-sectional view of the example sub assembly of FIGS. 2A and 2B.
Figure 4B:
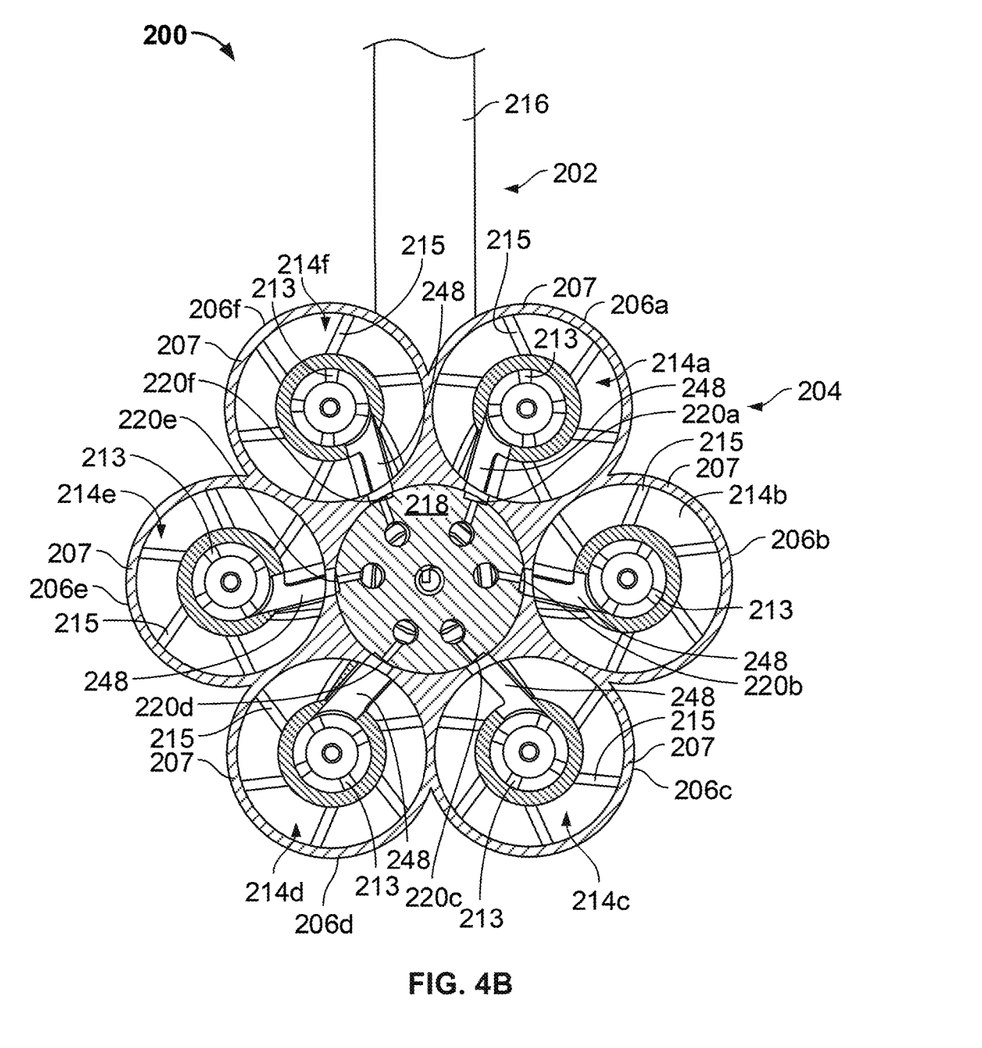
FIG. 4B is a partial, front cross-sectional views of the example sub assembly of FIGS. 2A and 2B.

FIGS. 4A and 4B are partial, side and front cross-sectional view of the example sub assembly 200. The cross-section plane 4A-4A for FIG. 4A is shown in FIG. 2A; and the cross-section plane 4B-4B for FIG. 4B is shown in FIG. 4A. FIG. 4A illustrates the venturi structure of the mixer body 207 with respect to the mixer elements 206a-f. As described above, the venturi includes a first conical section 207a, a cylindrical section 207b, and a second conical section 207c, providing a converging-diverging configuration. During use, airflow is introduced into the internal cavity of the mixer body 207 through an inlet 226 and directed axially towards an outlet 228. As shown, the prefilmers 214a-f reside in a rear housing 230 of the internal cavity that is upstream of the venturi and proximate the inlet 226.

Figure 5A:
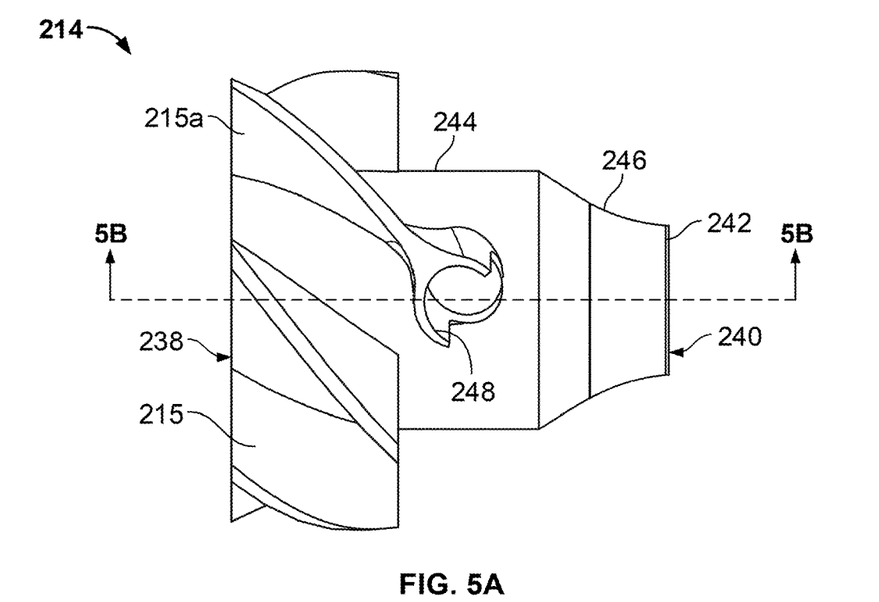
FIG. 5A is a side view of an example prefilmer.
Figure 5B:
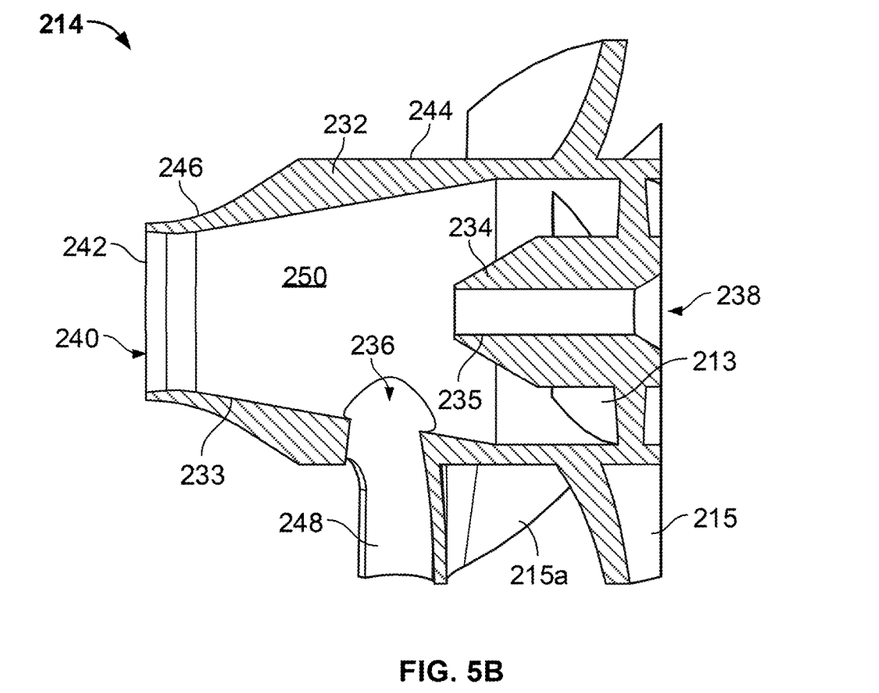
FIG. 5B is a half, side cross-sectional view of the example prefilmer of FIG. 5A.

FIG. 5A provides a side view of an example prefilmer 214 that can be incorporated in the sub-assembly 200 (e.g., prefilmers 214a-f); and FIG. 5B provides a half cross-sectional view of the prefilmer 214. The cross-section plane 5B-5B for FIG. 5B is shown in FIG. 5A. As shown, the prefilmer 214 includes a hollow tubular frame 232, an interior air injector 234 projecting axially through a portion of the bore 233 of the frame 232, and a radial fuel injection port 236. The bore 233 of the frame 232 extends axially from an inlet 238 to an outlet 240, with the outlet 240 being defined by a prefilming lip 242. As shown, the bore 233 of the frame 232 is convergent along its length from the inlet 238 towards the outlet 240. The interior air injector 234 resides at the inlet end of the bore 233 and is oriented to discharge air towards the outlet 240. In this example, the outer surface of the frame 232 includes a cylindrical section 244 and a converging section 246 sloping radially inwards to form the prefilming lip 242.

The inner air swirler 213 and the outer air swirler 215 are carried on an outer surfaces of the fuel injection port 236 and the frame 232, respectively. Thus, when the prefilmer 214 is installed within the mixer body 207 (c.f. FIGS. 4A and 4B), the vanes of the outer air swirler 215 extend radially between the outer surface of the frame 232 and the inner surface of the mixer body 207 (i.e., the inner surface of the housing 230), and the vanes of the inner air swirler 213 extend radially between the outer surface of the interior air injector 234 and the bore 233 of the frame 232. The prefilmer 214 further includes a fuel shield 248 for guiding fuel spray from the fuel injector assembly 202 into the prefilming frame 232. In some examples, the fuel shield 248 may be integrated with the outer air swirler 215. For instance, in this particular implementation, the fuel shield 248 is formed by the trailing edge of a vane 215a of the outer air swirler 215. In this example, the fuel shield 248 is a partially cupped channel that at least partially shelters the incoming fuel spray from the cross-flow of swirling air passing through the mixer body 207. However, in some other implementations the fuel shield may be provided as a fully enclosed passageway. In some implementations, a fully enclosed passageway may provide superior protection of the fuel spray, while a partially cupped channel is may be significantly less susceptible to coking because there is less surface area that may become wetted with liquid fuel. The fuel shield 248 leads to the fuel injection port 236. The fuel injection port 236 is biased in an offset direction relative to an axial centerline of the prefilmer 214, so as to meet with the slope of the curved wall 250 of the bore 233. Thus, the fuel injection port 236 is biased in a direction that is in accord with the curved inner wall 250, such that fuel entering the bore 233 immediately forms a substantially continuous film along the wall 250.

Returning now to FIGS. 4A and 4B (c.f., FIGS. 5A and 5B), the axial airflow introduced to the internal cavity of the mixer body 207 of each mixer element 206a-f is partitioned by the prefilmers 214a-f into three separate portions—an outer air flow portion flowing across the vanes of the outer air swirler 215, an inner air flow portion flowing across the vanes of the inner air swirler 213, and a central portion flowing through a bore 235 of the interior air injector 234. The outer airflow portion and the inner airflow portion have a swirling motion induced by the inner air swirler 213 and the outer air swirler, respectively, while the central air flow portion emerges from the interior air injector 234 as an axial jet. As described above, a spray of liquid or gaseous fuel is provided to the mixer elements 206a-f via the peripheral orifices 220a-f of the fuel injector assembly 202. Fuel discharged from the peripheral orifices 220a-f is directed through a radial opening 252 in the outer wall of the mixer body 207 and introduced to the prefilmers 214a-f. The fuel is guided by the fuel shield 248 to the fuel injection port 236, which causes the fuel to form a film along the curved inner wall 250 of the prefilming tubular frame 232. The biased nature of the fuel injection port 236 immediately promotes a pseudo adhesion of the incoming fuel spray to the inner wall 250, and therefore improves the helical centrifuge motion of the fuel provided by the swirling inner air flow portion, resulting in circumferential uniformity of the fuel flow at the prefilming lip 242. The inwardly sloping features of the mixer body 207 (i.e., the first conical section 207a), the inner bore 233 of the prefilming tubular frame 232, and outer surface section 246 of the frame 232 cause the outer air flow portion, the inner air flow portion carrying the uniformly distributed fuel film, and the central air flow portion to converge at the prefilming lip 242 in the mixing region of the mixer body 207 (i.e., the cylindrical section 207b). Shearing forces between the respective air flow portions at the mixing region atomize the fuel film into very fine fuel particles. The atomized fuel expands outward into the second conical section 207c of the mixer body 207, towards the outlet 228.

Figure 6:
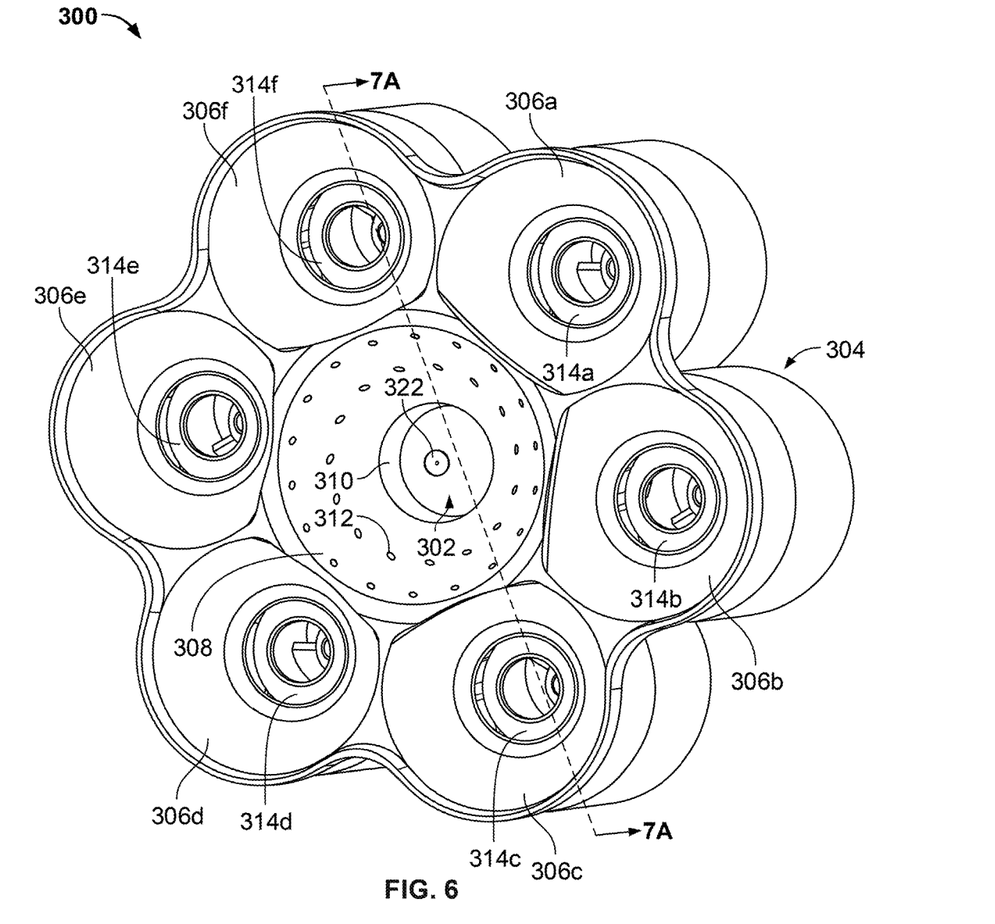
FIG. 6 is a front perspective view of second example gas turbine combustor sub-assembly, including a fuel/air mixer assembly and fuel injector assembly.

FIG. 6 is a front perspective view of second example gas turbine combustor sub-assembly 300, which is substantially similar to the sub-assembly 200 earlier shown and described. Accordingly, the combustor assembly 300 includes a fuel injector assembly 302 and a fuel/air mixer assembly 304. The mixer assembly 304 includes a plurality of mixer elements 306a, 306b, 306c, 306d, 306e, and 306f residing in a symmetrical arrangement about a center element 308. The center element 308 defines a central mixer passage 310 having a venturi that enables mixing of airflow and fuel. The center element 308 further includes a plurality of cooling air passages 312. The fuel injector assembly 302 includes a tip portion 318 having multiple peripheral fuel orifices (described below with reference to FIGS. 7A and 7B) and a central orifice 322. The peripheral orifices are located circumfentially around the tip portion 318, and oriented radially outward, such that each peripheral orifice is in alignment with a corresponding mixer element 306a-f. The central orifice 322 sprays fuel into the central mixer passage 310 of the center element 308. Each of the mixer elements 306a-f includes a fuel/air mixer body 307 (see FIG. 7A) featuring a venturi structure to facilitate the mixing of air and fuel for combustion. Each of the mixer elements 306a-f further includes a prefilmer 314a-f, respectively, located within the internal cavity of the mixer body 307. As described in detail below, in this example, the prefilmers 314a-f feature a double-frame structure that produces two separate fuel films.

Figure 7A:
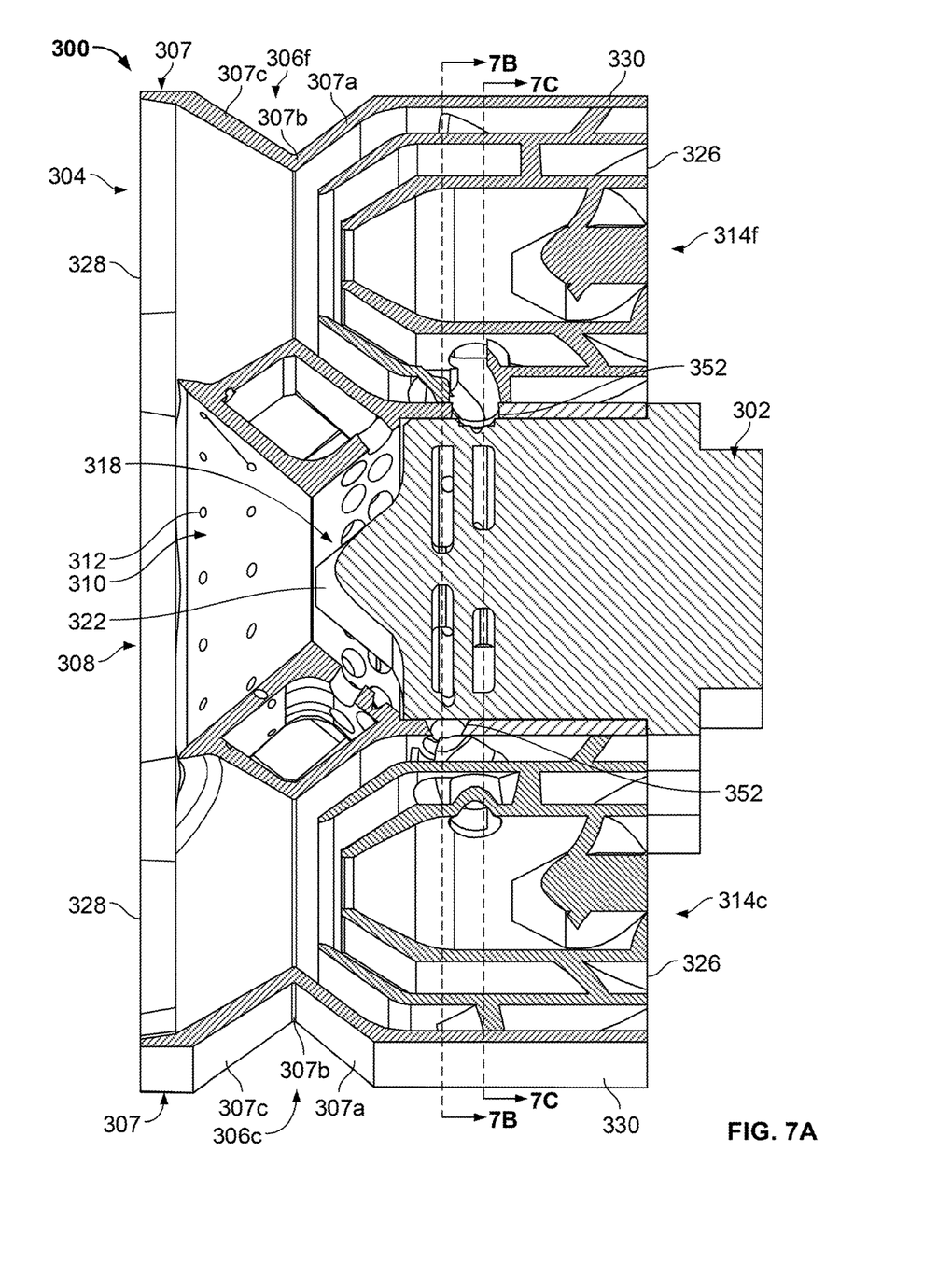
FIG. 7A is a partial, side cross-sectional view of the example sub-assembly of FIG. 6.
Figure 7B:
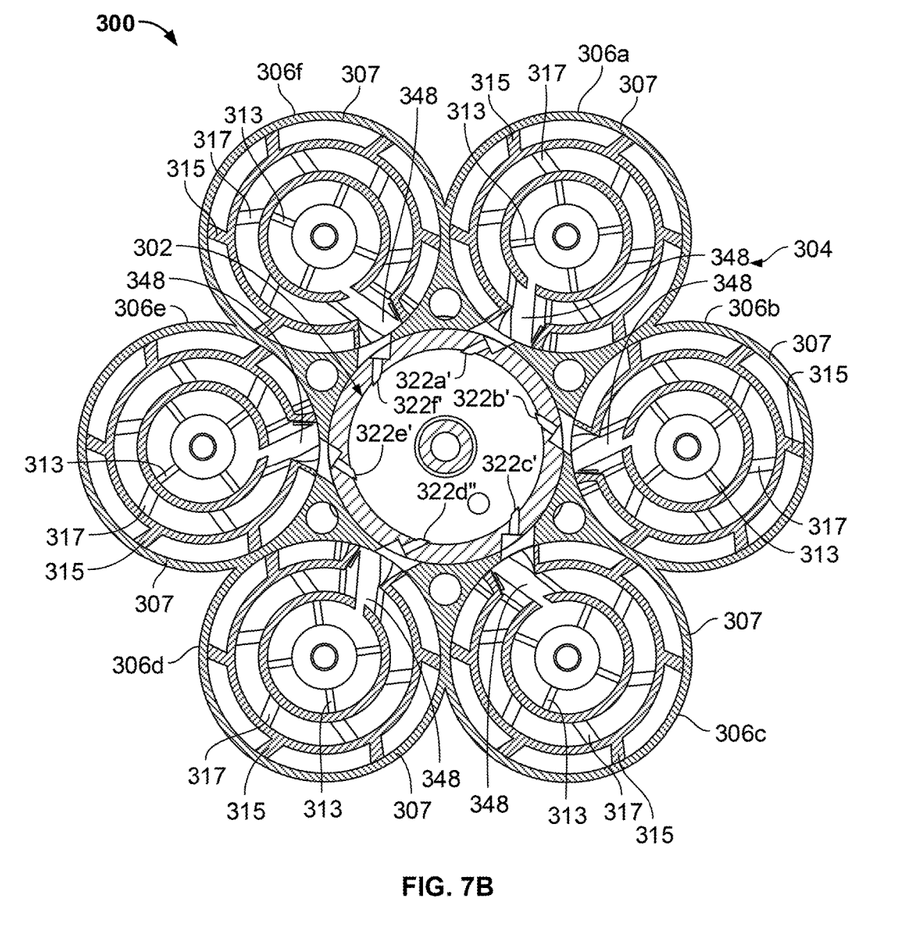
FIG. 7B is a first partial, front cross-sectional view of the example sub-assembly of FIG. 6.
Figure 7C:
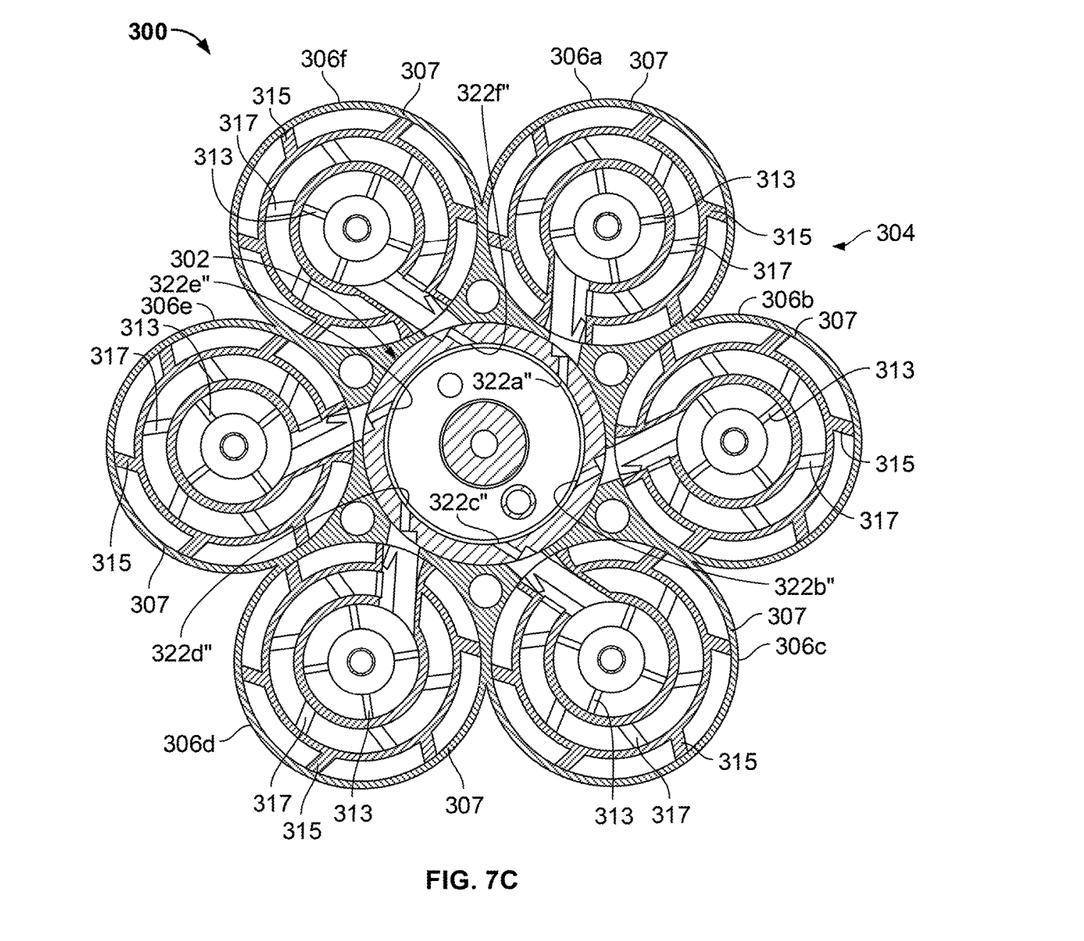
FIG. 7C is a second partial, front cross-sectional view of the example sub-assembly of FIG. 6.

FIG. 7A is a partial, side cross-sectional view of the sub-assembly 300 (see cross-section plane 7A-7A shown in FIG. 6); FIG. 7B is a partial, front cross-sectional view of the sub-assembly 300 (see cross-section plane 7B-7B shown in FIG. 7A); and FIG. 7C is a second partial, front cross-sectional view of the example sub-assembly 300 (see cross-section plane 7C-7C shown in FIG. 7A). FIG. 7A illustrates the venturi structure of the mixer body 307 with respect to the mixer elements 306a-f. The venturi includes a first conical section 307a, a cylindrical section 307b, and a second conical section 307c to provide a converging-diverging configuration. Airflow is introduced into the internal cavity of the mixer body 307 through an inlet 326 and directed axially towards an outlet 328. The prefilmers 314a-f reside in a rear housing 330 of the internal cavity that is upstream of the venturi and proximate the inlet 326. FIGS. 7B and 7C illustrate a configuration of peripheral orifices provided in the fuel injector assembly 302 to accommodate the double-frame prefilmers 314a-f. As shown, the peripheral orifices are provided in pairs to provide two separate fuel sprays to each prefilmer. FIG. 7B illustrates the first orifice of each pair 322a', 322b', 322c', 322d', 322e' and 322f', and FIG. 7C illustrates the second orifice of each pair 322a", 322b", 322c", 322d" 322e" and 322f".

Figure 8A:
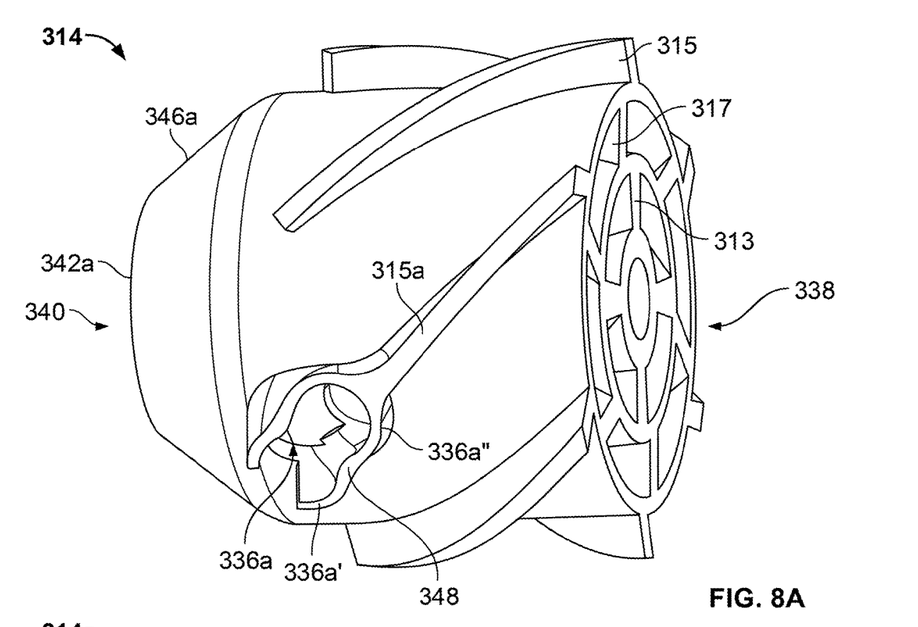
FIG. 8A is a perspective side view of a second example prefilmer.
Figure 8B:
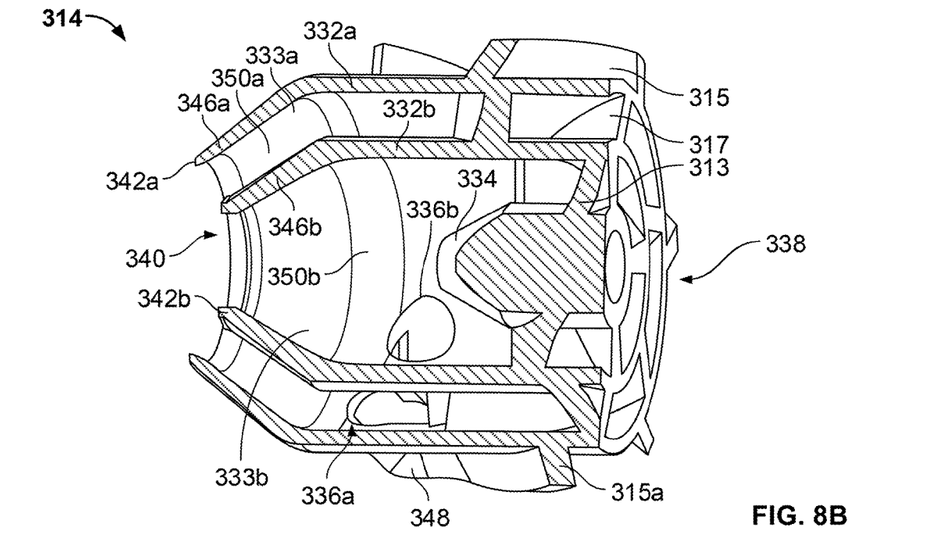
FIG. 8B is a partial, perspective side cross-sectional view of the example prefilmer of FIG. 8A.

FIG. 8A provides a perspective side view of an example prefilmer 314 that can be incorporated in the sub-assembly 300 (e.g., prefilmers 314a-f); and FIG. 8B provides a partial, perspective side cross-sectional view of the prefilmer 314. As shown, the prefilmer 314 includes a first hollow tubular frame 332a and a second hollow tubular frame 332b that extends coaxially through the bore 333a of the first. The prefilmer 314 further includes an interior air injector 334 projecting axially through a portion of the bore 333b of the second frame 332b, a first radial fuel injection port 336a, and a second radial fuel injection port 336b. The bore 333a of the first frame and the bore 333b of the second frame each extend axially from an inlet end 338 to an outlet end 340, with each outlet terminating in a respective prefilming lip 342a, 342b. As shown, the prefilming lip 342b of the second frame 332b is located just upstream of the prefilming lip 342a of the first frame 332a. Each of the frames 332a, 332b includes a converging section 346a, 346b sloping radially inwards to form the prefilming lips 342a, 342b.

In this example, the prefilmer 314 includes three air swirlers—an inner air swirler 313, an outer air swirler 315, and a middle air swirler 317. With the prefilmer 314 installed within the mixer body 307, the vanes of the outer air swirler 315 extend radially between the outer surface of the first frame 332a and the inner surface of the mixer body 307 (c.f. FIGS. 7A-7C), the vanes of the middle air swirler 317 extend radially between the outer surface of the second frame 332b and the bore 333a of the first frame 332a, and the vanes of the inner air swirler extend radially between the outer surface of the interior air injector 334 and the bore 333b of the second frame 332b. The prefilmer 314 further includes a fuel shield 348 for guiding fuel spray from the fuel injector assembly 302 into the prefilming frames 332a, 332b. As shown, the fuel shield 348 is formed by the trailing edge of a vane 315a of the outer air swirler 315. In this example, the fuel shield 348 is a partially cupped channel that at least partially shelters the incoming fuel from the cross-flow of swirling air passing through the mixer body 307. Of course, in some other implementations the fuel shield may be provided as a fully enclosed passageway. The fuel shield 348 leads to the first fuel injection port 336a. The first fuel injection port 336a includes a biased portion 336a' and an unbiased portion 336a". The biased portion 336a' is offset relative to an axial centerline of the prefilmer 314, angled so as to meet with the slope of the curved inner wall 350a of the first frame 332a, which causes a first fuel spray from the fuel injector assembly 302 to form a first substantially continuous film along the wall 350a. The unbiased portion 336a" is aligned with the second fuel injection port 336b and allows a second fuel spray from the fuel injector assembly 302 to pass through the first frame 332a and into the second frame 332b. The second fuel injection port 336b is biased in an offset direction relative to the axial centerline of the prefilmer 314, angled so as to meet with the slope of the curved wall 350b of the bore 333b of the second frame 332b. Thus, the second fuel spray directed through the first fuel injection port 336a is received by the second fuel injection port 336b, which is designed to create a second substantially continuous film along the wall 350b.

Returning to FIGS. 7A-7C (c.f., FIGS. 8A and 8B), the axial airflow introduced to the internal cavity of the mixer body 307 of each mixer element 307a-f is partitioned by the prefilmers 314a-f into four separate portions—an outer air flow portion flowing across the vanes of the outer air swirler 315, a middle air flow portion flowing across the vanes of the middle air swirler 317, an inner air flow portion flowing across the vanes of the inner air swirler 313, and a central portion flowing through the interior air injector 334. The outer, middle, and inner air flow portions have a swirling motion induced by the respective air swirlers. The central air flow portion emerges from the interior air injector 334 as an axial jet. As described above, dual sprays of fuel are provided to the mixer elements 306a-f via the peripheral orifices 320a'-f' and 320a"-f" of the fuel injector assembly 302. Fuel discharged from the peripheral orifices is directed through a radial opening 352 in the outer wall of the mixer body 307 and guided by the fuel shield 348 to the first and second fuel injection ports 336a, 336b, which cause the fuel to form two separate fuel films along the curved inner walls 350a, 350b of the prefilming tubular frames 332a, 332b. In this particular implementation, the fuel shield 348 is formed by the trailing edges of a vane in the outer air swirler 315, and another vane in the middle air swirler 317. The inwardly sloping features of the mixer body 307 (i.e., the first conical section 307a) and the converging sections 346a, 346b of the prefilming frames 332a, 332b cause the outer air flow portion, the middle air flow portion carrying the first fuel film, the inner air flow portion carrying the second fuel film, and the central air flow portion to converge at the prefilming lips 342a, 342b in the mixing region of the mixer body 307 (i.e., the cylindrical section 307b), where shearing forces between the respective air flow portions atomizes the fuel films into very fine fuel particles. The atomized fuel expands outward into the second conical section 307c of the mixer body 307, towards the outlet 328.

Notably, the concepts herein have been discussed in connection with a combustor and sub-assemblies for a gas turbine engine. However, they are not so limited. For example, the same concepts could be applied to other forms of engines, as well as other apparatus using combustors and/or combustion chambers.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

What is claimed is:

1. A turbine combustor assembly, comprising:
    a fuel/air mixer assembly comprising a plurality of fuel/air mixer elements, each of the fuel/air mixer elements comprising:
        a fuel/air mixer body having an internal cavity extending axially between an air inlet and an air outlet; and
        a prefilmer residing within the internal cavity of the fuel/air mixer body, the prefilmer comprising:
            a frame having a bore defining a curved inner wall;
            an axial inner air flow passage within the bore of the frame, the axial inner air flow passage extending coaxially with an axial centerline of the internal cavity of the fuel/air mixer body; and
            a radial fuel injection port residing along the curved inner wall of the bore of the frame and in fluid communication with the air flow passage; and
    a fuel injector coupled to the fuel/air mixer assembly, the fuel injector arranged to direct fuel into a plurality of the fuel/air mixer elements via the fuel injection port of the prefilmer of each fuel/air mixer element, the fuel injector comprising a tip portion comprising a central fuel outlet and a plurality of peripheral fuel outlets, each of the peripheral fuel outlets being fluidically coupled to a respective fuel injection port.

2. The turbine combustor assembly of claim 1, where at least one of the peripheral fuel outlets comprises a non-atomizing fuel injection orifice.

3. The turbine combustor assembly of claim 2, where the central fuel outlet comprises at least one of an air-blast injector tip and a pressure atomizing injector tip.

4. The turbine combustor assembly of claim 1, where the fuel injection port of the prefilmer of at least one fuel/air mixer element is biased in an offset direction relative to an axial centerline of the prefilmer.

5. The turbine combustor assembly of claim 4, where the offset direction is in accord with the curved inner wall of the frame of the prefilmer, such that fuel entering the prefilmer through the fuel injection port forms a substantially continuous film along the inner wall.

6. The turbine combustor assembly of claim 5, where the prefilmer of the at least one fuel/air mixer element comprises an air swirler residing within the axial inner air flow passage at location upstream of the fuel injection port.

7. The turbine combustor assembly of claim 6, where the air swirler comprises a circumferential array of angled air swirler vanes distributed about the axial centerline of the internal cavity of the fuel/air mixer body.

8. The turbine combustor assembly of claim 7, where the prefilmer further includes an air injector upstream of the fuel injection port projecting axially through the inner air flow passage of the prefilmer, and where the air swirler vanes extend radially from a surface of the air injector.

9. The turbine combustor assembly of claim 1, where the prefilmer of at least one fuel/air mixture element comprises an air swirling vane residing on an outer surface of the prefilmer.

10. The turbine combustor assembly of claim 9, where a trailing edge of the air swirling vane is arranged to at least partially shield fuel directed through the fuel injection port from cross flowing air traversing the internal cavity of the fuel/air mixer body.

11. The turbine combustor assembly of claim 1, where the prefilmer comprises at least one additional radial fuel injection port and at least one additional inner air flow passage concentric with the axial inner air flow passage, the at least one additional radial fuel injection port being arranged to direct a fuel stream into the at least one additional inner air flow passage.

12. The turbine combustor assembly of claim 1, where the fuel injector comprises a tip portion including a first fuel outlet configured to direct fuel having a first spray pattern into one of the plurality of fuel/air mixer elements and a second fuel outlet configured to direct fuel having a second spray pattern that is different from the first spray pattern into a center fuel/air mixer element residing at the center of an arrangement of the plurality of fuel/air mixer elements.

13. The turbine combustor assembly of claim 12, where the fuel injector includes a first fuel feed arranged to convey fuel to the first fuel outlet and a second fuel feed separate from the first fuel feed arranged to convey fuel to the second fuel outlet.

14. The turbine combustor assembly of claim 1, further comprising a center fuel/air mixer element, and where the plurality of fuel/air mixer elements are arranged symmetrically around the center fuel/air mixer element.

15. The turbine combustor assembly of claim 14, where the center fuel/air mixer element comprises a plurality of cooling air passages downstream of the fuel injector.

16. A turbine combustor assembly, comprising:
a fuel/air mixer assembly comprising a plurality of fuel/air mixer elements, each of the fuel/air mixer elements comprising:
a fuel/air mixer body having an internal cavity extending axially between an air inlet and an air outlet; and
a prefilmer residing within the internal cavity of the fuel/air mixer body, the prefilmer comprising:
a frame having a bore defining a curved inner wall;
an axial inner air flow passage within the bore of the frame, the axial inner air flow passage extending coaxially with an axial centerline of the internal cavity of the fuel/air mixer body; and
a radial fuel injection port residing along the curved inner wall of the bore of the frame and in fluid communication with the air flow passage; and
a fuel injector coupled to the fuel/air mixer assembly, the fuel injector arranged to direct fuel into a plurality of the fuel/air mixer elements via the fuel injection port of the prefilmer of each fuel/air mixer element,
where the inner air flow passage of the prefilmer of at least one fuel/air mixer element comprises a converging nozzle outlet, and where an outer surface of the frame of the prefilmer comprises a converging section sloping radially inwards to form a prefilming lip at the nozzle outlet.

17. The turbine combustor assembly of claim 16, where the fuel/air mixer body of the at least one fuel/air mixer element comprises a Venturi structure defining an annular gap adjacent the nozzle outlet of the prefilmer and a throat mixing region at a point downstream from the gap.

18. A turbine combustor assembly, comprising:
a fuel/air mixer assembly comprising a plurality of fuel/air mixer elements, each of the fuel/air mixer elements comprising:
a fuel/air mixer body having an internal cavity extending axially between an air inlet and an air outlet; and
a prefilmer residing within the internal cavity of the fuel/air mixer body, the prefilmer comprising:
a frame having a bore defining a curved inner wall;
an axial inner air flow passage within the bore of the frame, the axial inner air flow passage extending coaxially with an axial centerline of the internal cavity of the fuel/air mixer body; and
a radial fuel injection port residing along the curved inner wall of the bore of the frame and in fluid communication with the air flow passage; and
a fuel injector coupled to the fuel/air mixer assembly, the fuel injector arranged to direct fuel into a plurality of the fuel/air mixer elements via the fuel injection port of the prefilmer of each fuel/air mixer element,
where the prefilmer further comprises a fuel shield arranged to guide fuel from the fuel injector to the fuel injection port, and where the fuel shield comprises a partially cupped channel integrated with an air swirler residing on an outer surface of the prefilmer.

19. The turbine combustor assembly of claim 18, where the fuel injection port of the prefilmer of at least one fuel/air mixer element is biased in an offset direction relative to an axial centerline of the prefilmer, and where the offset direction is in accord with the curved inner wall of the frame of the prefilmer, such that fuel entering the prefilmer through the fuel injection port forms a substantially continuous film along the inner wall.

* * * * *